Figure 2:
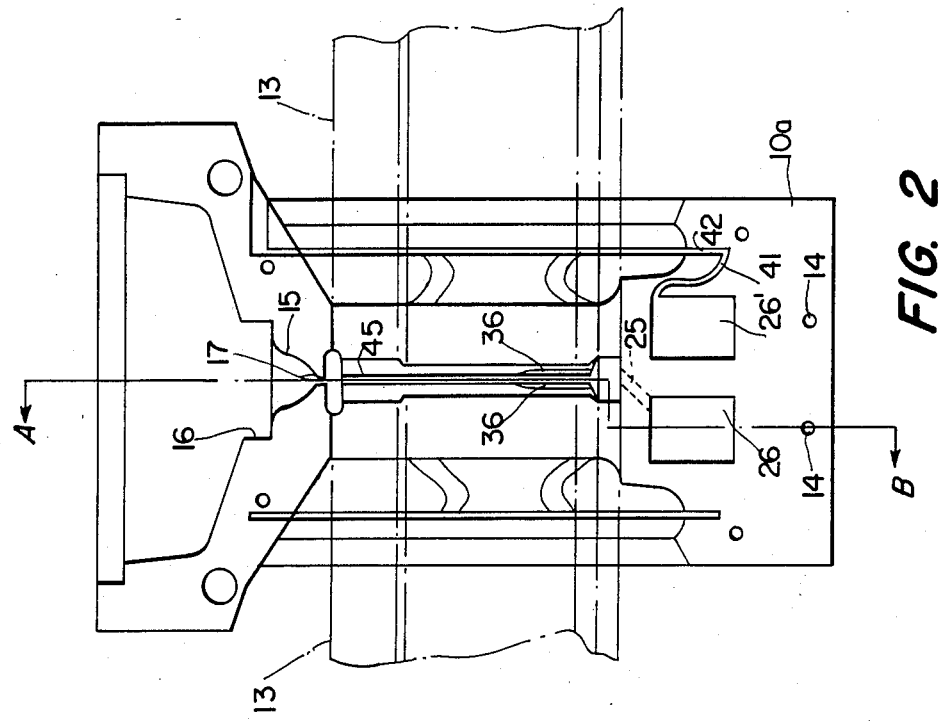

United States Patent [19]

Fricke

[11] Patent Number: 4,605,053

[45] Date of Patent: Aug. 12, 1986

[54] ART OF MOLD WELDING

[75] Inventor: Hans D. Fricke, Brielle, N.J.

[73] Assignee: Orgo-Thermit Inc., Lakehurst, N.J.

[21] Appl. No.: 647,626

[22] Filed: Sep. 5, 1984

Related U.S. Application Data

[63] Continuation of Ser. No. 189,521, Sep. 22, 1980, abandoned, which is a continuation of Ser. No. 43,542, May 29, 1979, abandoned.

[51] Int. Cl.$^4$ ................. B23K 23/00; B22D 19/04
[52] U.S. Cl. ........................... 164/54; 164/98; 164/103; 164/104; 164/105; 164/108; 249/86
[58] Field of Search ............ 164/98, 103, 104, 105, 164/54, 108; 249/86

[56]  References Cited

U.S. PATENT DOCUMENTS 2,932,863  4/1960  Ahlert ........................ 164/54
3,091,825  6/1963  Deppler, Jr. et al. ........ 164/54

Primary Examiner—Kuang Y. Lin

Attorney, Agent, or Firm—Toren, McGeady, Stanger, Goldberg & Kiel

[57]  ABSTRACT

This invention relates to an improvement in the process of mold welding two metal parts together having respective base sections, which includes enclosing the end sections of said metal parts in aligned end-to-end relation in a mold having an entrance gate, flowing molten metal through said entrance gate into said mold, and out of said mold at rates so related as to cause some of the metal admitted into the mold to be discharged from said mold while the rest of the molten metal accumulates as a metal bath to cause the molten metal during the early stage of its admission into the mold to preheat the metal parts, and conducting some of the said molten metal during said early stage from the entrance gate through a recess and directly onto said base sections in direct impingement with said base sections to promote better heat transfer between said molten metal and said metal parts, the improvement comprising discharging molten metal through at least two separate exit gates into separate discharge chambers located underneath said base sections. The invention further relates to an improvement in a mold for performing the improved process.

4 Claims, 2 Drawing Figures

ART OF MOLD WELDING

This is a continuation of application Ser. No. 189,521 filed Sept. 22, 1980 now abandoned, which was a continuation of Ser. No. 043,542, filed May 29, 1979, now abandoned.

The present invention relates to the art of mold welding and is an improvement on the process and apparatus described and claimed in U.S. Pat. No. 3,242,538.

In the commercial aluminothermic process of welding metal parts together such as T-rails, the parts are aligned end-to-end, the mold is placed around these parts in the region of the weld to be formed, a charge of aluminothermic mixture is ignited in a crucible located above the mold and the crucible is tapped at the proper time to deliver superheated molten steel into the mold. A fusible tap control disc or a number of such discs may be employed in the tap hole of the crucible as a plug to prevent the aluminothermic mixture, after it has become ignited and fused, from discharging before the metal has had time to become completely melted and superheated and the aluminothermic slag has collected at the top. At the proper time, the metal disc or discs melts and the crucible is automatically tapped.

Preheating of the mold cavity is a prerequisite to the forming of a proper weld and, in U.S. Pat. No. 3,091,825, there is disclosed and claimed a mold constructed to eliminate the use of special combustion or preheating chambers requiring special heating mediums, such as hot gases or torch flames. In accordance with the invention disclosed in the latter patent, the mold is provided with a sump or discharge chamber or chambers connected to the mold cavity by an exit gate or gates. The pouring or entrance gate is desirably larger than the exit gate or gates in cross-sectional area so that part of the molten metal which streams through the gap between the confronting faces of the metal parts being welded and which preheats these faces, flows into the discharge chamber or chambers, while the remainder of the metal forms a liquid bath between these faces. By discharging some of the metal from the mold cavity, a greater amount of the superheated metal for preheating is made to flow across the confronting faces of the parts being welded together. The extent of this preheating depends on the relative sizes of the entrance and exit gates in cross-sectional area, the size of the sump or discharge chamber, and other factors.

It is important with the process and apparatus described to effect transfer of the heat from the molten metal to the metal parts to be welded together during the preheating stage as rapidly and as efficiently as possible, to reduce the amount of aluminothermic mixture required to make an effective weld.

In the process and apparatus described in U.S. Pat. No. 3,242,538, the self-preheating welding process utilizes about one-third of the liquid steel first entering the gap between the rail sections to be welded in order to preheat the rail ends. The preheating results of the rail ends will be best, particularly in the area of the outer legs of the base, when equal amounts of liquid steel pass both sides of the rail base before entering the sump or discharge chamber.

However, if the process and apparatus of U.S. Pat. No. 3,242,538 is employed to weld rail sections in elevated track, for example in curves, and the center line of the mold, after being mounted to the rail section, deviates from the vertical, the majority of the liquid steel will pass along the lower base portion, giving insufficient heat to the opposite elevated part. Because of this uneven and insufficient preheating in the outer part of the rail base, this might result in a partial lack of fusion between the aluminothermic steel and the rail steel in the area of insufficient preheating.

This disadvantage is overcome by the present invention by providing two separate discharge chambers, each of which will be separately filled through one side of the base. Both discharge chambers, arranged side by side underneath the base of the rail, are of identical geometry. By this means, exactly the same amount of liquid aluminothermic steel will wash alongside both rail ends, thus providing the same amount of preheat to the rail ends to be welded.

Furthermore, it is important that these discharge chambers be located underneath the rail section, thus assuring a controlled and slow-cooling rate of the base section of the rail, which is always the thinnest cross-section of the rail. This is particularly important with alloyed rail steels where the cooling rates must be controlled in order to avoid the formation of embrittled structures such as Martensite or Bainite.

Figure 1:
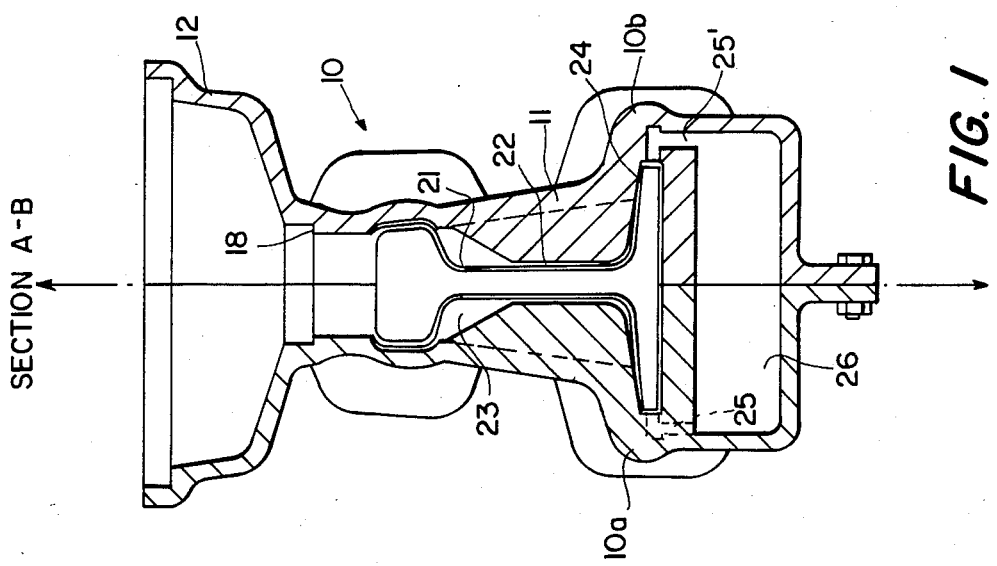

The invention will be further illustrated by reference to the accompanying drawings in which FIG. 1 is a section of the inventive mold welding assembly taken on line A-B of FIG. 2, and FIG. 2 is an interior face view of one half or section of the mold welding assembly of the present invention.

Referring to the drawings, the welding unit 10 comprises a mold 11 and a crucible 12 designed to weld together the two rail parts 13, shown in phantom in FIG. 2. The welding unit 10 is of the porous type made, for example, of sand bonded together by a resin such as phenol-formaldehyde and is expendable.

The welding unit 10 is of the split form comprising two duplicate interchangable sections 10a and 10b, and are adapted to be bolted together into a face-to-face contact through the holes 14 or joined together by clamps, and when assembled, conjointly define the lower mold 11 and the upper crucible 12 for the aluminothermic mixture. The crucible 12 has an outlet 15 in the form of a neck, circularly at its upper section 16 and a reduced cross-section at its lower section 17 to form a shoulder 18 serving as a seat for one or more circular tap control discs, not shown, but which are adapted to fit into the upper outlet section 16. The lower section 17 of the crucible outlet serves not only as the tap hole for the crucible 12 but also is the entrance gate for the mold 11 so that the stream of metal drawn from the crucible is not exposed to the atmosphere before entering the mold. This obviates heat losses in the tapped metal from radiation or conduction to the atmosphere.

The welding unit sections 10a and 10b also conjointly define the mold cavity 21 for receiving in end-to-end alignment and in spaced relationship the sections of the rail parts 13 to be welded together. This mold cavity 21 conforms in outline to the contour of the rail parts 13 to be welded together except for a space 22 around the perimeter of the cavity, just sufficiently deep and sufficiently wide to form a thin band in the region of the junction between the parts, thereby assuring a good solid weld therebetween, and except for the recesses 23, which are located in the walls of the welding unit sections 10a and 10b forming the side walls of the mold cavity and which extend along the walls for conducting the molten metal directly onto the top of the bases 24 of the rail parts 13, is more clearly shown in FIG. 5 of U.S.

Pat. No. 3,242,538. In the case of a rail bond, the mold cavity 21 will have a T-shaped cross-section conforming closely to that of the rail parts 13 to be welded except for the small clearance 22 around the sides and bottom of the rail parts in the order of about ⅜" deep and except for the recesses 23.

Communicating with the mold cavity 21 through the bottom exit gates 25 and 25' is a pair of discharge chambers 26 and 26', shown in FIG. 2, each of which is individually connected to one of the exit gates 25 and 25', respectively. These discharge chambers are formed by the assembled welding unit sections 10a and 10b. As noted above, it is essential that these discharge chambers be located underneath the rail section, thus assuring a controlled and slow cooling rate of the base section of the rail, which is always the thinnest cross-section thereof.

By dividing the sump or discharge chamber into two individual chambers 26 and 26', exactly the same amount of liquid aluminothermic steel will wash along both sides of the rail ends to be welded even if the welding unit 10 is at an angle to the vertical inasmuch as, for example, if the mold shown in FIG. 2 were tilted to the left, the discharge chamber 26 would fill with aluminothermic steel and the remainder then would be forced into the discharge chamber 26', thereby assuring that the same amount of steel contacted both sides of the rail base. This construction, accordingly, is a great improvement over the construction shown in U.S. Pat. No. 3,242,538, in which if the welding unit were mounted at an angle, more steel would flow on one side of the rail base than on the other.

The total cross-sectional area of the exit gates 25 and 25' is shown smaller than the cross-sectional area of the tap hole or entrance gate 17 to permit the molten steel to flow into the mold cavity 21 at a greater rate than it is discharged therefrom through the exit gates 25 and 25' and to thereby permit the metal bath formed in the mold cavity 21 to rise. The ratio should be so selected that the flow of the liquid aluminothermic steel will be delayed so that it can impart a maximum amount of its heat to the rail section to be welded, but still remain in contact with the cold rail and only sufficiently long so that partial solidification will not occur. If the latter does occur, it will result in partial solidification of the aluminothermic steel with local slag/steel mixture inclusions at the fusion line between the aluminothermic steel and the rail steel. It has been found that the best results are obtained by selecting the ratio of entrance gate cross-section to total exit gate cross-section less than 12:1.

The sump or discharge chambers 26 and 26' are at least large enough to be completely filled at the end of the period of pour. Therefore, the size of the sump or discharge chambers 26 and 26' depends upon the amount of preheating metal required. How efficiently that preheating metal is employed is determined by the flow paths in the mold cavity 21 and by the rate of rise of the metal bath in the cavity, which, in turn, is determined by the relative cross-sectional areas of the entrance gate 17 and the exit gates 25 and 25'.

A vent is provided in each welding unit section, as shown at 42 in FIG. 2 and having a connecting portion 41 which connects the vent to the sump or discharge chamber 26'. A similar vent and connection is provided in the opposite mold welding unit section 10b thereby forming a means for the escape of gases and a means to accommodate excess metal.

In performing the process of the present invention, the two rail parts 13 to be welded together are arranged so that they will be in alignment end-to-end and separated by a gap 45. In the case of conventional T-rail parts 13, the gap may be in the order of ½" to ¾" depending on the rail size.

The welding unit sections 10a and 10b are brought together around the rail parts 13 to be welded so that the gap 45 between the end confronting faces of these parts is located in alignment with the walls 35 centrally dividing the recesses 23. The width of the recesses is such that the ends of the bases 24 of the T-rail parts 13 project underneath the recesses, so that at least a substantial part of the molten steel flowing through the channels 36 formed from the recesses will impinge the upper surfaces of the bases.

After the welding unit sections 10a and 10b have been brought together around the T-rail parts 13 to be welded as described and secured by bolting or otherwise, the ends of the unit sections are closed with sealing material. Tap control discs are then placed on the seat 18 of the crucible outlet 15 and a charge of aluminothermic material is placed in the crucible 12. The discs are desirably made of a metal according to the tapping time required and in the case wherein the parts 13 to be welded together are rails, the discs are of steel. The number of the tap control discs should be sufficient to assure enough delay before tapping to permit the aluminothermic reduction to be substantially completed, any metallic additives present to be completely melted, and the slag to be completely collected on top.

The aluminothermic charge in the crucible 12 composed of metal oxide and aluminum is ignited in known manner to produce metal and aluminum oxide, and the exothermic heat created by this reaction melts and superheats the metal, and at the proper time melts the entire stack of tap control discs. In the case where T-rails are to be welded, the metal oxide in the aluminothermic charge would be essentially iron oxide and the charge would contain the necessary alloying metals or other additives to form steel.

The melting of the tap control discs will cause the discharge of the molten metal through the tap hole 17 and into the mold cavity 21.

Because the boundaries of the cavity 21 follow conformably close to the rail parts 13 to be welded except for the space 22 and the recesses 23, a substantial portion of the tapped molten metal will pass through the gap 45 and between the cold confronting end faces of the rail parts 13, thereby preheating the end faces and consequently the end regions of the parts in the vicinity of the faces. In addition, a substantial portion of the tapped molten metal will pass through the channels 36 and impinge directly onto the top of the bases 24 of the T-rail parts 13, thereby preheating the bases effectively. The molten metal sweeping across the confronting faces of the rail parts 13 and impinging onto the bases 24 of these rail parts eventually reaches the exit gates 25 and 25' and discharges into the sump or discharge chambers 26 and 26' respectively. Because the molten metal is delivered to the mold cavity through the entrance gate or tap hole 17 at a greater rate than it is discharged through the exit gates 25 and 25' into the sump or discharge chambers 26 and 26', the metal will accumulate in the mold cavity 21 to form a metal bath therein, and the surface of the bath will rise at a rate slower than would be possible in the absence of the exit gates, thereby affording sufficient time to properly preheat the adjoining end sections of the rail parts 13. As noted above, even if the welding unit is mounted at an angle, an equal amount of steel preheats each side of the rail base 24.

The metal fuses the end sections of the rail parts 13 to form a homogeneous weld with and between these parts and also fills up in the space 22 to form a wrapping band, not shown, around the weld area only thin enough to assure a good solid weld between these parts. In addition, the metal solidified in the mold channels 36 forms fins on the weld which may be left thereon. Although these fins represent added aluminothermic mixture employed in forming the weld, the saving in aluminothermic mixture due to the more efficient heat transfer resulting from direct impingement of the molten metal onto the bases 24 of the rail parts 13 more than offsets this added aluminothermic mixture, so that the total amount of aluminothermic mixture to make a good weld with the process and apparatus of the present invention is materially reduced.

As the molten metal is being poured into the mold cavity 21, some of the air and other gases in the mold cavity are forced into the sump or discharge chambers 26 and 26' and escape therefrom through the vent 42 and connection 41, shown in FIG. 2, with the corresponding vent and connection being provided in the opposite welding unit half, not shown. With the air and gases vented so easily from the welding unit, no destructive gas pressures are created so that a successful weld is assured. Also by means of this venting, the welding unit need not be as heavy as when venting is accomplished slowly through the porous walls of the unit.

It will be obvious to those skilled in the art that many modifications may be made within the scope of the present invention without departing from the spirit thereof, and the invention includes all such modifications.

What is claimed is:

1. In the process of mold welding two metal parts together having respective base sections, which includes enclosing the end sections of said metal parts in aligned end-to-end relation in a mold having an entrance gate, flowing molten metal through said entrance gate into said mold, and out of said mold at rates so related as to cause some of the metal admitted into the mold to be discharged from said mold while the rest of the molten metal accumulates as a metal bath to cause the molten metal during the early stage of its admission into the mold to preheat the metal parts, and conducting some of the said molten metal during said early stage from the entrance gate through a recess and directly onto said base sections in direct impingement with said base sections to promote better heat transfer between said molten metal and said metal parts, the improvement comprising discharging molten metal through at least two separate exit gates in opposite sides of said mold into separate non-communicating discharge chambers of substantially identical geometry located underneath said base sections to fill said separate chambers with said molten metal, said gate on one side of said mold discharging into one chamber only and said gate on the opposite side of said mold discharging into the other chamber only, whereby exactly the same amount of molten metal washes alongside both base sections even if the centerline of the mold deviates from the vertical and thus provides the same amount of preheat to said sections.

2. A process according to claim 1 including venting said separate discharge chambers to the atmosphere.

3. In a mold for welding two metal parts together having respective bases, said mold having side walls defining a mold cavity for enclosing therein the confronting end sections of said metal parts in aligned end-to-end relationship, said mold having entrance gate means for the molten metal leading into the upper part of said mold cavity, exit gate means near the lower part of the mold cavity and discharge chamber means on the discharge side of said exit gate means, said entrance gate means and exit gate means being relatively dimensioned to cause flow through said entrance gate means at a greater rate than discharge through said exit gate means, said side walls also defining a recess constituting an extension of said mold cavity and extending from a region near the upper part of said mold cavity, along said mold cavity and to a region near the lower part of the mold cavity where said recess discharges, said recess extending at its lower discharge end to a region which is located beyond the region where the end sections of the metal parts confront and which is opposite a region of a base of one of said metal parts in a direct impinging path of the molten metal discharged from said recess, whereby heat transfer between said molten metal and the impinged base region of said metal part is promoted, the improvement comprising at least two separate exit gate means near the lower part of said mold cavity, in opposite sides of said mold, separate non-communicating discharge chamber means of substantially identical geometry located underneath said mold cavity, means connecting said exit gate means in one side of said mold with one of said discharge chamber means only, and means connecting said exit gate means in the other side of said mold with the other of said discharge chamber means only, whereby molten metal fills both said discharge chamber means and exactly the same amount of molten metal washes alongside both bases even if the centerline of the mold deviates from the vertical and thus provides the same amount of preheat to said bases.

4. A mold according to claim 3 in which the ratio of the entrance gate cross-section to the sum of the cross-sections of the exit gates is less than about 12:1.

* * * * *